US008499661B2

(12) United States Patent
Rake et al.

(10) Patent No.: US 8,499,661 B2
(45) Date of Patent: Aug. 6, 2013

(54) SELECTOR LEVER HAVING ACTUATING CHANGE OF POSITION

(75) Inventors: Ludger Rake, Steinfeld (DE); Andreas Giefer, Lemfoerde (DE); Sascha Rosentreter, Espelkamp (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 300 days.

(21) Appl. No.: 13/059,492

(22) PCT Filed: Aug. 11, 2009

(86) PCT No.: PCT/DE2009/050042
§ 371 (c)(1),
(2), (4) Date: Feb. 17, 2011

(87) PCT Pub. No.: WO2010/020244
PCT Pub. Date: Feb. 25, 2010

(65) Prior Publication Data
US 2011/0162475 A1 Jul. 7, 2011

(30) Foreign Application Priority Data

Aug. 20, 2008 (DE) .......................... 10 2008 041 374

(51) Int. Cl.
*B60K 20/00* (2006.01)
*G05G 5/08* (2006.01)
*F16H 59/04* (2006.01)
(52) U.S. Cl.
USPC ..................... 74/473.25; 74/473.26; 74/473.3

(58) Field of Classification Search
USPC ........... 74/473.1, 473.21, 473.23–26, 473.28, 74/473.3, 473.32, 473.33, 473.35; 192/220.2–220.4, 220.7; 70/247
See application file for complete search history.

(56) References Cited

U.S. PATENT DOCUMENTS

| 5,078,242 A * | 1/1992 | Ratke et al. ...................... 477/96 |
| 5,251,723 A | 10/1993 | Rolinski et al. |
| 5,799,517 A * | 9/1998 | Hattori et al. ..................... 70/247 |
| 6,325,196 B1 * | 12/2001 | Beattie et al. ............. 192/220.4 |
| 6,644,142 B2 * | 11/2003 | Junge et al. ................ 74/473.25 |
| 6,684,730 B2 | 2/2004 | Giefer et al. |
| 2004/0194567 A1 * | 10/2004 | Giefer et al. ................. 74/473.3 |
| 2010/0024584 A1 | 2/2010 | Giefer et al. |

(Continued)

FOREIGN PATENT DOCUMENTS

| DE | 199 44 179 C1 | 1/2001 |
| DE | 100 05 328 A1 | 8/2001 |

(Continued)

*Primary Examiner* — David M Fenstermacher
*Assistant Examiner* — Jake Cook
(74) *Attorney, Agent, or Firm* — Davis & Bujold, PLLC

(57) ABSTRACT

An operating device for shift-by-wire transmission comprises a selector lever which has a detent mechanism. The detent mechanism comprises bevel and notched contours that can be displaced for automatically returning the selector lever back to the first lock position or shift gate. The notched contour is spring-biased toward the selector lever detent element and overlaps the bevel contour in its first position, and an actuating block is provided for locking the notched contour in its first position near the detent element. The spring-loading of the notched contour is weaker than the spring-loading of the detent element, and the shape of the first detent position of the notched contour matches that of the first detent position of the bevel contour when the notched contour is located in the first position. The operating device enables actuator-controlled automatic return, and optional locking of the selector lever with little design effort, while simultaneously having low space requirements and minimal generation of any disturbing noise.

8 Claims, 3 Drawing Sheets

FOREIGN PATENT DOCUMENTS

| | | |
|---|---|---|
| DE | 199 54 698 C2 | 11/2001 |
| DE | 10 2004 034 559 A1 | 2/2006 |
| DE | 10 2007 015 262 A1 | 10/2008 |
| EP | 0 429 193 A2 | 5/1991 |
| WO | 98/03803 A2 | 1/1998 |
| WO | 2006/007942 A1 | 1/2006 |

* cited by examiner

SELECTOR LEVER HAVING ACTUATING CHANGE OF POSITION

This application is a National Stage completion of PCT/DE2009/050042, filed Aug. 11, 2009, which claims priority from German patent application serial no. 10 2008 041 374.7, filed Aug. 20, 2008.

FIELD OF THE INVENTION

The invention relates to an operating device for a gear shifting transmission, e.g. for a manual or automatic transmission having shift-by-wire actuation.

BACKGROUND OF THE INVENTION

Gear shifting transmissions of motor vehicles are generally shifted or controlled by means of an operating device disposed within reach of the driver. Actuating elements such as shift levers or selector levers are used regularly for this purpose, and are located, for example between the front seats of the motor vehicle or in other regions of the cockpit.

In the case of mechanical transmission control or mechanical coupling between the selector lever and the gear shifting transmission—using a cable or linkage for example, the selector lever position always coincides with the actual transmission state due to the mechanical coupling. As a result, the driver can deduce, on the basis of the particular selector lever position, the current gear state of the transmission, and, then he can feel confident that the lever position coincides with the actual gear state of the transmission.

However, when gear shifting transmissions are actuated electrically or using shift-by-wire, the actuating lever in the passenger compartment and the motor vehicle transmission in the engine compartment are no longer mechanically coupled in this manner. Instead, in the case of "shift-by-wire" transmissions, the shift commands are transmitted from the operating device to the motor vehicle transmission using electrical or electronic signals, and the shift commands are then implemented in the transmission using electrohydraulics, for example. Due to the absence of a mechanical connection between the transmission actuator system and the actuating lever, the transmission state, any shift interlocks, or impermissible shift commands can no longer impact the state of the actuating lever directly and noticeably for the driver.

In by-wire actuated gear shifting transmissions, however, the absence of a mechanical connection between the transmission actuator system and the selector lever can, under certain basic conditions or in the case of an error, also lead to the selector lever position no longer coinciding with the gear state of the transmission.

For example, modern automatic transmissions generally include a so-called "Auto-P" function, for example, that ensures that when the driver leaves the vehicle, the parking lock may possibly be engaged automatically in the transmission, for instance to prevent the unattended vehicle from rolling away if the driver failed to engage the parking lock before leaving the vehicle. In other words, the Auto-P function, which particularly can be automatically activated, when the ignition key is removed or the driver leaves the vehicle, ensures that the parking lock is automatically engaged in the transmission, regardless of the gear state that was actually selected using the selector lever. Thus, the parking lock would also be engaged automatically by the Auto-P function of the transmission or the vehicle if the driver had left the selector lever e.g. in the neutral position, in a tip gate that may be present, or in one of the gear selection positions.

In this case however, the selector lever position does not coincide with the actual gear state of the transmission. When the driver returns to the vehicle or at the next attempt to start the vehicle, the position of the selector lever would therefore provide the driver visually and haptically with initially incorrect information. On the basis of his perception of the selector lever position, the driver would have to assume that the transmission is engaged in a neutral position, in the tip mode or in a gear selection position, although the transmission is actually engaged in the parking lock. This discrepancy between the selector lever position and transmission state could therefore lead to undesired operating errors or incorrect conclusions by the driver.

The applicant's document, DE 10 2007 015 262, A1, discloses an operating device for a motor vehicle transmission having a device for selector lever return, which has an actuating device having a gear motor, with which the selector lever can automatically be returned from the manual shift gate (tip gate) into the automatic gate, or the selector lever can automatically be returned into the park lock position, for example. This known operating device is, however, associated with a certain design complexity in order to implement the desired actuating mobility of the selector lever, with the corresponding consequence of construction space and costs. It must also be expected that the electromotive drive and the reduction gear that are present there can generate disruptive noises.

The same applies for the gear shift device for an automatic transmission known from DE 100 05 328, A1. In this gear shift device, a detent element connected to a selector lever is simultaneously in engagement with a notched contour and a ramp that is adjustable by a motor. By means of the ramp, the detent element can be brought out of engagement with the notched contour, and subsequently due to the incline of the ramp—together with the selector lever—can be automatically returned into a specific detent position. The motor or hydraulic drive of the ramp in this known device is, however, also relatively complex and requires considerable construction space. In the case of a drive using an electric gear motor noise problems are also to be expected.

SUMMARY OF THE INVENTION

Proceeding from this background, the problem addressed by the present invention is to create an operating device for a gear shifting transmission, with which the stated disadvantages found in the prior art can be overcome. The purpose of the invention is to reliably ensure that the selector lever position always reflects the actual gear state of the transmission, even with shift-by-wire-controlled gear shifting transmissions, for example in the case of the P-position, whereby reliable visual and tactile feedback about the actual gear state of the transmission can be realized. The invention is to prevent particularly that the selector lever, in the case of an automatically engaged park lock ("Auto-P"), remains misleadingly in the last engaged shift position. In contrast to the solutions known from the prior art, this functionality is to be implemented, however, with low design complexity, minimal construction space and without generating disruptive noises.

In an initially known manner, the operating device according to the present invention comprises a housing base and a selector lever having a spring loaded detent element. The selector lever is movable back and forth between at least two detent positions or shift gates. Also in a known manner, the operating device further comprises a detent mechanism for locking the selector lever in the individual detent positions, wherein the detent mechanism has a notched contour for locking the selector lever and a bevel contour—having a corresponding incline with respect to the detent element—for automatically returning the selector lever into the first detent position. The detent element of the selector lever can be substantially simultaneously brought to overlap, or into engagement, with the notched contour and also with the bevel contour, and the notched contour and the bevel contour can be moved by actuation relative to each other in the direction of the selector lever detent element.

According to the invention, the operating device is distinguished, however, in that the bevel contour is connected substantially rigidly to the housing base, whereas the notched contour can be moved back and forth relative to the housing base between a first position near the detent element and a second position away from the detent element. The notched contour is spring-loaded in the direction of the detent element of the selector lever, and in its first position overlaps the bevel contour such that the detent element of the selector lever in this position of the bevel contour is effectively in engagement only with the notched contour. Furthermore, the actuating device is formed by an actuator-controlled block for locking the notched contour in its first position near the detent element. The spring-loading of the displaceable notched contour is effectively weaker than the spring-loading of a detent element, and the first detent position of the notched contour (relative to the detent element of the selector lever in its first detent position) coincides with the first detent position of the bevel contour.

Due to the simultaneous engagement of the detent element disposed at the selector lever in the two notched contours of the detent mechanism, and due to the actuating relative displaceability of the two notched contours, the two notched contours of the detent mechanism can thereby be brought into simultaneous, or selectively into engagement with the detent element of the selector lever. In particular, both notched contours of the detent mechanism—for the purpose of the normal operation of the selector lever—are displaceable relative to each other so that the bevel contour is mostly overlapped by the notched contour, that is, the detent element of the selector lever is in effective engagement only with the notched contour. This means that the detent element of the selector lever in any shift position of the selector lever locks into a corresponding indentation of the notched contour, and therefore the selector lever initially remains stable in the respectively selected position.

However, if the selector lever now—e.g., in the case of Auto-P—is to be moved automatically back out of a shift position (or out of one of the shift gates) into the park lock position (or into the first shift gate), the notched contour can be moved for this purpose—relative to the bevel contour or relative to the housing base—so that the detent element of the selector lever is no longer in engagement with the notched contour, but instead is now in effective engagement with the bevel contour. Due to the incline of the bevel contour and the spring-loading of the detent element this leads to the detent element of the selector lever sliding on the bevel contour downward in the direction of the incline, whereby the selector lever is automatically set into motion, and only comes to rest in the position or the shift gate in which it corresponds to the appropriate first detent position of the bevel contour, or its lowest position.

The constructively very simple representation of the automatic selector lever return that is the goal of the invention results because the bevel contour according to the invention is connected substantially rigidly to the housing base, whereas the notched contour is spring-loaded and disposed movable relative to the housing base—and thus also relative to the bevel contour connected to the housing base—and can be locked in its position near the detent element by means of an actuating block.

Thus, according to the invention—for returning the selector lever into its first detent position—complex actuators, particularly, motors with gearing reduction or the like, are no longer necessary. Rather, the actuator for relative movement of the two notched contours can, due to the invention, be limited to simple locking of the movable notched contour in its position near the detent element. Thus, for returning the selector lever it is only necessary to release the locking of the movable notched contour by means of a simple actuator, whereupon the actual return movement of the selector lever can then occur due to the potential energy stored in the spring of the selector lever detent element.

This is possible particularly because the spring-loading of the displaceable notched contour is effectively weaker than the spring-loading of the detent element at the selector lever, and also because the first detent position of the notched contour matches the first detent position of the bevel contour. Due to the effectively weaker spring-loading of the displaceable notched contour with respect to the selector lever detent element, the displaceable notched contour after releasing its locking is automatically disengaged by the spring-loaded detent element of the selector lever, and as a result the detent element comes into effective engagement with the bevel contour. Due to the incline of the bevel contour and due to the spring-loading of the detent element, this results in the return of the selector lever into the desired first lock position or first shift gate.

If the selector lever has reached the desired first detent position or shift gate, that is, the detent element of the selector lever has arrived at the first detent position or at the lowest location of the bevel contour, then the displaceable notched contour, due to its spring-loading, can return again into its starting position because the first detent position of the notched contour in its starting position coincides, according to the invention, with the first detent position or with the lowest location of the bevel contour.

The actuating block for locking the notched contour in the first position near the detent element is preferably formed by an armature of an electromagnet. In this manner, a constructively simple and robust representation of the actuator control of the displaceable notched contour is obtained. However, other actuators could be used just as well, for instance, linear drives, piezo elements, memory alloys, or electric motors, e.g., having locking cams.

Further, the invention is implemented independent of how the spring-loaded detent element disposed on the selector lever is constructively formed, so long as the required simultaneous or parallel engagement into the notched contour and into the bevel contour can be guaranteed. According to a preferred embodiment of the invention, however, the selector lever has a substantially cylindrical or prismatic elongated shape having a substantially constant cross-section. The detent element is preferably formed as a spring-loaded detent roller.

A substantially cylindrical or prismatic shape of the detent element is constructively easy to implement, and with it, can simply guarantee the simultaneous engagement in the notched contour and the bevel contour. The design of the detent element as a spring-loaded detent roller is advantageous in that only low frictional losses arise between the detent element and the notched contour or the bevel contour, whereby a reliable return of the selector lever into the desired first detent position or shift gate is guaranteed.

The actuator system according to the invention is not limited to use of a selector lever with the change of detent positions, instead it can be used equally well—with an operating device having a plurality of shift gates—for an automatic lever return into a specific shift gate. Accordingly, in a further embodiment of the invention, the detent mechanism is designed for locking the selector lever into at least two shift gates.

In a corresponding double design of the detent mechanism, a return through actuation of the selector lever into both a specific shift gate as well as into a specific detent position within a shift gate can be implemented.

In a further embodiment of the invention, the actuator device comprises a crosspiece for guiding the selector lever, where a locking clip is disposed on the crosspiece. The locking clip can be locked to the housing base using a locking actuator. This way, the crosspiece, and with it, the selector lever can be locked in one of the detent positions or shift gates, whereby particularly shift interlocks, for instance shift lock, or blocking a change of shift gates into specific shift gates can be implemented in a simple manner, so that, for example, it is possible to switch into the manual tip gates only from the shift position "D" of the automatic gates, and not however from the shift positions "P", "R" or "N".

Preferably the locking actuator is formed by the end of an armature of an electromagnetic actuator which can be brought to engage with the locking clip disposed on the crosspiece. The operating device particularly preferably comprises an electromagnetic actuator which serves both for locking the notched contour and for the locking engagement with the locking clip, and thus for blocking the selector lever in the first detent position or shift gate.

The advantageous double function design of the electromagnetic actuator is attained in that both ends of the armature of the actuator are used functionally, in that the one end of the armature is designed for locking the notched contour and the opposite end of the armature is designed for locking engagement with the locking clip.

Because the locking of the notched contour is only released through actuation if the selector lever is not located in the first detent position or shift gate, whereas the locking engagement of the armature, in contrast occurs only if the selector lever is located in the first detent position or shift gate, the double use of the common armature does not lead to undefined shifting states or undesired blocks of the shift lever.

BRIEF DESCRIPTION OF THE DRAWINGS

The invention is explained below in greater detail with reference to drawings that merely depict examples of embodiments. They show.

DETAILED DESCRIPTION OF THE PREFERRED EMBODIMENTS

Figure 1:
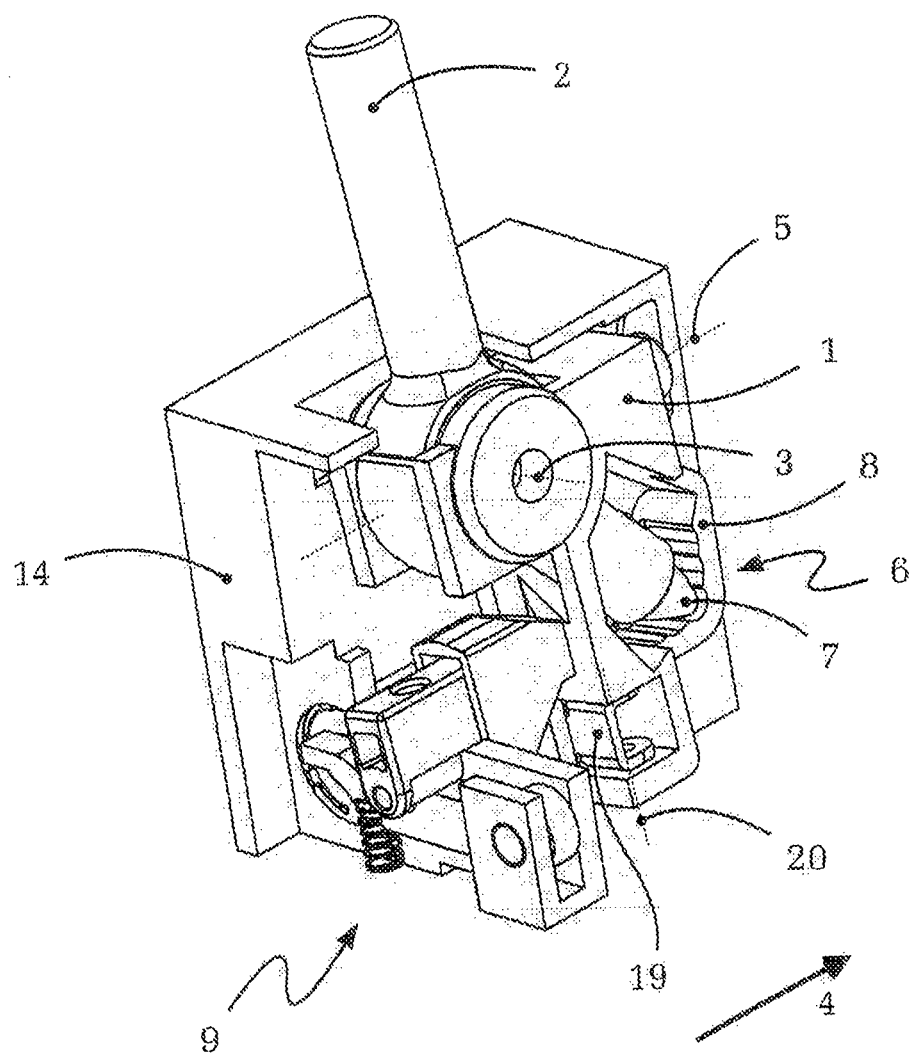
FIG. 1 a schematic, isometric view of one embodiment of an operating device according to the present invention.

FIG. 1 shows, in a schematic, isometric depiction one embodiment of an operating device according to the present invention. For better understanding and improved clarity, parts of the housing base 14, the crosspiece 1 and the selector lever 2 are not shown in FIG. 1.

Here, the actuation lever or selector lever 2 can be seen mounted in a crosspiece 1. The selector lever 2, due to its mounting in the crosspiece 1, can be moved about a first pivot axis 3 back and forth relative to the direction of travel 4 of the motor vehicle, while the crosspiece 1 together with the selector lever 2 can pivot laterally back and forth about a second pivot axis 5. In this manner, the two degrees of freedom of movement of the selector lever 2 are defined—for example, within a typical shift pattern of a manual gear actuation, or in the shift pattern of an automatic transmission having an additional manual shift gate.

The operating device according to FIG. 1 has two detent mechanisms. The first detent mechanism 6, having a spring-loaded interlock pin 7, serves for locking the selection lever 2 during movement forward or backward, relative to the vehicle, of the selector lever about the first pivot axis 3, see vehicle direction 4. In the embodiment shown, the first detent mechanism 6 is a monostable detent mechanism in which, in the absence of external forces, the selector lever 2, due to the shape of the notched gate 8, always returns again to its neutral central position along the vehicle direction 4.

The second detent mechanism 9 serves for locking the selector lever 2 in the transverse direction, in the case of sideways movements of the selector lever 2 about the second pivot axis 5, that is, during shift gate changes of the selector lever 2.

Figure 2:
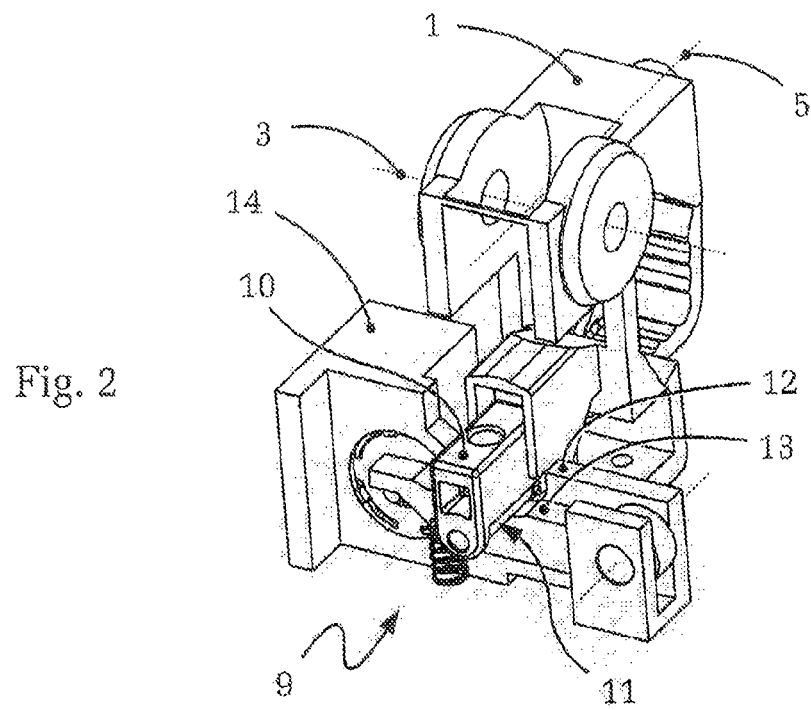
FIG. 2 a crosspiece and detent mechanism of the operating device according to FIG. 1 in a view and representation corresponding to FIG. 1.

The second detent mechanism 9 is shown again in FIG. 2, together with the essential components of the crosspiece 1. First, the crosspiece 1 can be seen, having the two pivot axes 3 and 5. Further, a bearing element 10 in spring-loaded connection to the crosspiece 1 by means of a compression spring (not shown) and having a detent roller 11 mounted therein in a rotational manner, can be seen in FIG. 2, as well as a notched contour arrangement comprised of the notched contours 12 and 13. The arrangement of the two notched contours 12 and 13 is emphasized again very clearly in the FIGS. 3 and 4.

With lateral movements of the selector lever 2 and with it also, the crosspiece 1, the bearing element 10 with the detent roller 11 pivots sideways—about the pivot axis 5, in the opposite direction to the movements of the selector lever 2—, whereby the detent roller 11 moves into the area of the contours of the notched contour arrangement 12 and 13 and in the process contacts the respectively active notched contour of the two contours 12, 13.

Figure 3:
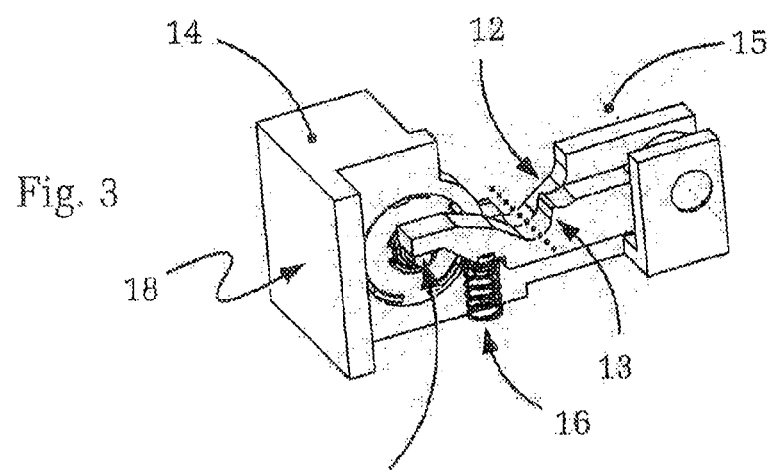
FIG. 3 a schematic, isometric view of both notched contours and the magnet actuator of the detent mechanism, with activated notched contour.

FIG. 3 shows in particular the manner in which the notched contour arrangement is composed of the two notched contours 12 and 13. It can be recognized that the first notched contour 12, which according to the invention represents the bevel contour 12 for returning the selector lever 2 into the first shift gate, is securely fastened to the housing base of the operating device (or to the actuator housing 14, which here is formed integrally with the housing base of the operating device). In contrast, the second notched contour, which according to the invention forms the notched contour 13 for locking the selector lever 2 in the shift gates, is connected to the housing base or to the actuator housing 14 in a pivotable manner about the axis 15 according to FIGS. 3 and 4.

The notched contour 13 is spring-loaded by means of a coil spring 16 in the direction of its upper position, with respect to the drawing, and is additionally secured in this upper position by the end of an armature pin 17 of an electromagnetic actuator 18, as shown in FIG. 3. It can be seen that the bevel contour 12 in the relative position of the two notched contours 12, 13 shown in FIG. 3 is overlapped by the notched contour 13, whereby the detent roller 11 initially contacts only the notched contour 13, and initially remains unaffected by the bevel contour 12.

This means, in other words, that in the relative position of the two notched contours 12 and 13 shown in FIG. 3, normal, bistable locking of the detent roller 11 and with it, the crosspiece 1 as well as the selector lever 2, occurs in the two shift gates of the represented operating device, so long as the notched contour 13 is located in the upper, locked position, relative to the drawing according to FIG. 3.

If in contrast, the selector lever 2 moves under actuator control out of the shift gate according to the representation in FIG. 1 and automatically returns into the other of the two shift gates of the represented operating device, then, the magnetic actuator 18 is activated for this purpose, whereby the armature pin 17 is pulled back, and the notched contour 13 is released. Because the coil spring 16 of the displaceable notched contour 13 is effectively weaker than the downward, relative to the drawing, acting spring-loading of the detent roller 11 or of the bearing element 10, this leads to the enabling of the movement of the notched contour 13 by the then retracted magnet actuator 18, leading to that fact that the notched contour 13 is pressed or pivoted downward, relative to the drawing, about its pivot axis 15, due to the spring force of the spring-loaded detent roller 11.

Figure 4:
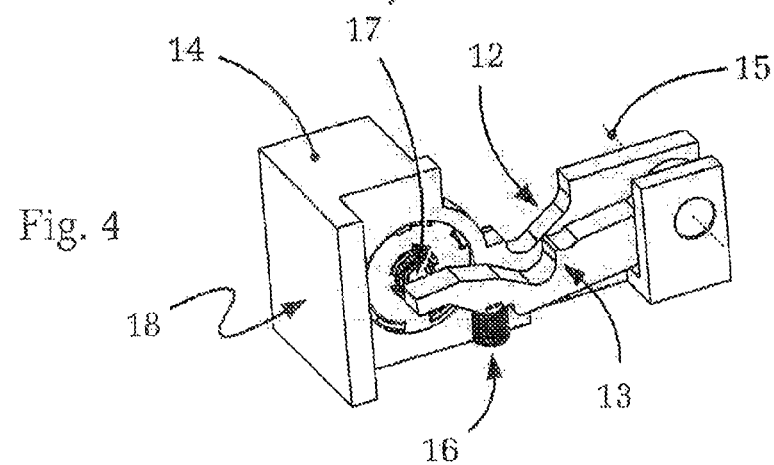
FIG. 4 the two notched contours and the actuator, with activated bevel contour in a view and representation corresponding to FIG. 3.

This results in the changed relative position between the notched contour 13 and the bevel contour 12, as shown in FIG. 4. In this relative position of the notched contour 13 and the bevel contour 12, the detent roller 11 interacts directly with the bevel contour 12, whereas the locking effect of the notched contour 13 is temporarily suspended.

Due to the spring-loading of the detent roller 11, this leads to the fact that detent roller 11 glides along the incline of the bevel contour 12, downward, and thus is deflected toward the left, relative to the drawing. As a result, the crosspiece 1 undergoes a rotation about the second pivot axis 5 (clockwise relative to the drawing), whereby the desired shift gate change of the selector lever 2 occurs automatically.

Because the shape of the notched contour 13 at its first detent position coincides with the lowest position of the bevel contour 12, when the notched contour 13 is located in its first position near the detent element (see FIG. 3 in the area of the dotted line), the notched contour 13 can, after completion of the shift gate change of the selector lever 2, return automatically from its position according to FIG. 4 into the position according to FIG. 3 due to the spring effect of the coil spring 16. Similarly, the armature pin 17 of the magnet actuator 18, in the relative position of the notched contours 12, 13 according to FIG. 4 still blocked in its retracted position, can return again into its starting position according to FIG. 3, in which it again fixes the notched contour 13 in its upper position, relative to the drawing, near the detent element. Thus, immediately after the actuator triggered automatic shift gate change of the selector lever 2, the normal operational readiness and locking of the operating device is restored.

Figure 5:
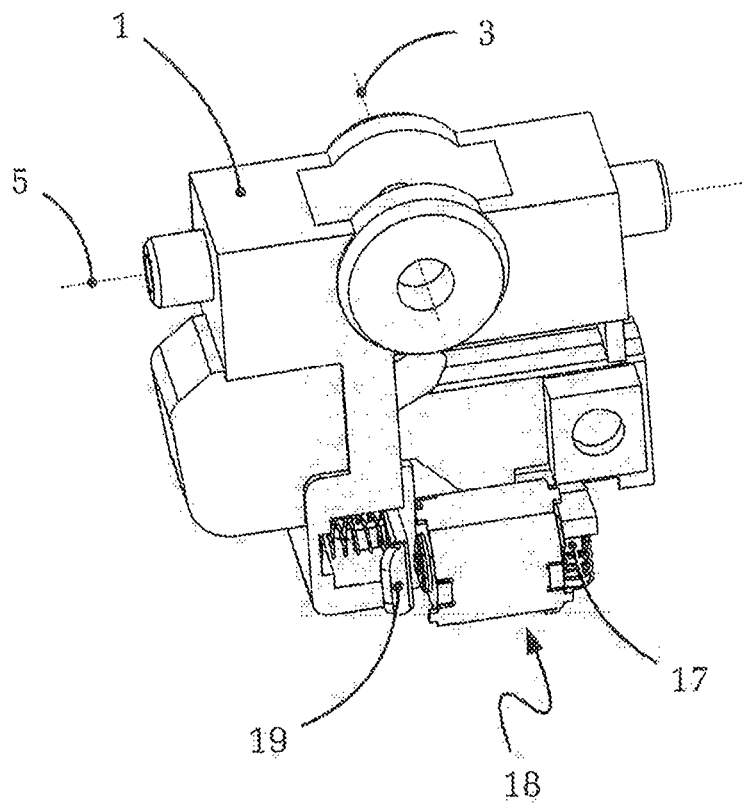
FIG. 5 a schematic, isometric side view of the crosspiece, magnet actuator and locking clip of the operating device according to FIG. 1 to 4.

FIG. 5 shows the locking clip 19, additionally present in this embodiment of the operating device, with which the selector lever 2 can be locked in the position of the first shift gate (see the dotted line in FIG. 3), e.g., in order to block under specific state conditions the change into the manual shift gate (for example, the selector lever in one of the "P", "R" or "N" positions). The locking clip 19, whose movable pivot connection to the crosspiece 1 by means of the pivot axis 20 is seen in FIG. 1, comprises, for the purpose of locking, a bore in the extension of the armature pin 17 of the magnet actuator 18, not visible in the figures.

Figure 6:
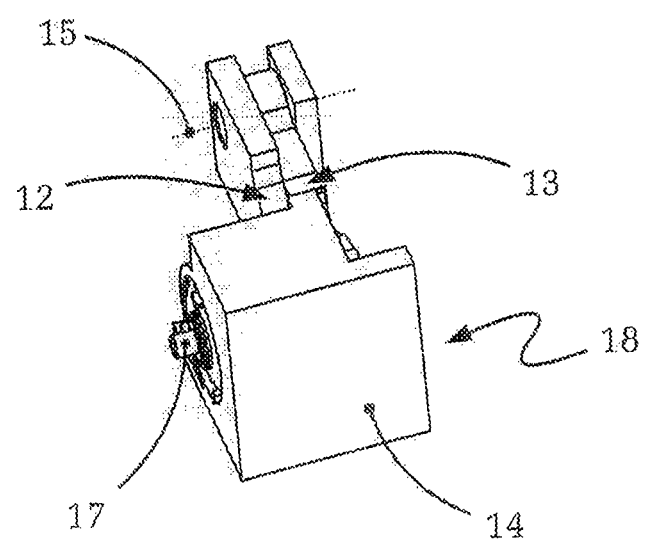
FIG. 6 the magnet actuator and the two notched contours of the operating device according to FIG. 1 to 5 in an enlarged representation and view corresponding to FIG. 5.

During activation of the magnet actuator 18, not only is the notched contour 13 unlocked, as described above based on the description of FIGS. 3 and 4, but simultaneously the rear end, relative to the FIG. 1 to 4, of the armature pin 17 of the magnet actuator 18, is deployed, see FIG. 6. As a result, this end of the armature pin 17 can travel into the associated bore of the locking clip 19, as soon as the actuating lever 2, and with it the crosspiece 1, are located in the position that coincides with the first shift gate (see dotted line in FIG. 3). Through this, the crosspiece 1 and actuating lever 2—by means of engagement of the armature pin 17 in the locking clip 19—are then locked in the first shift gate so long as the magnet actuator 18 remains activated, for example, as long as the selector lever is located in one of the positions "P", "R" or "N", for the case that the change into the manual shift gate is to be possible only from the selector lever position "D".

To facilitate and ensure the locking of the armature pin 17 of the magnet actuator 18 in the locking clip 19, the end of the locking clip 19 is sloped, and the locking clip 19 is spring-loaded, and connected to the crosspiece 1, pivotable about the pivot axis 20 according to FIG. 1. In this manner, the locking clip can engage into the armature pin 17 even when the armature pin 17 is already deployed, when the actuating lever 2 and crosspiece 1 move out of the second shift gate back into the first shift gate. With the same effect, the armature pin 17—instead of the locking clip 19—can also be spring-loaded in a suitable manner, so that it can be initially displaced by the incline of the locking clip during the return movement of the crosspiece 1, and subsequently can travel into the bore of the locking clip 19.

FIG. 6 shows again the unit comprised of the actuator housing 14 and bevel contour 12 assembled with the magnet actuator 18 and the notched contour 13 that is attached pivotably at the actuator housing 14 and bevel contour 12. Here, the armature pin 17 of the magnet actuator 18 can be seen which is extended backwards and which in this position can travel into the above named bore of the locking clip 19, and which this way locks the locking clip 19 and the crosspiece 1 connected to the locking clip 19 according to FIG. 5 in the first shift gate.

As a result, it is clear that the invention creates an operating device with which the desired actuating positions or shift gate changes can be implemented with low design cost, with minimal construction space and at the same time also being nearly silent. The invention therefore contributes to the improvement of ergonomics and safety, as well as the efficient use of construction space, and cost effectiveness, in particular in the case of applications in the field of shift actuators of motor vehicles.

The invention claimed is:

1. An operating device for selecting fixed gear ratios of a shift-by-wire gear shifting transmission, the operating device comprising:
 a housing base (14),
 a selector lever (2) being movable back and forth between at least a first detent position and a second detent position,
 a detent mechanism (9) comprising a spring-loaded selector lever detent element (11), the detent element (9)

further having a notched contour (13) that releasably locks the selector lever (2) and a bevel contour (12) that returns the selector lever (2) back into the first detent position, the selector lever detent element (11) being brought into simultaneous overlapping with the notched contour (13) and also the bevel contour (12), and the notched contour (13) and the bevel contour (12) being displacable relative to each other in a direction of the selector lever detent element (11);

the bevel contour (12) being essentially rigidly connected to the housing base (14), and the notched contour (13) being movable back and forth, relative to the housing base (14), between a first position near the detent element and a second position away from the detent element, the notched contour (13) being spring-loaded in the direction of the selector lever detent element (11), and in its first position overlaps the bevel contour (12); and the operating device comprising an actuating device (18) having an actuating block (17) for locking the notched contour (13) in its first position near the detent element, the spring-loading of the movable notched contour (13) being effectively weaker than the spring-loading of the selector lever detent element (11), and the first detent position of the notched contour (13) coincides with the first detent position of the bevel contour (12), when the notched contour (13) being located in its first position near the detent element.

2. The operating device according to claim 1, wherein the actuating block is an armature pin (17) of an electromagnet (18).

3. The operating device according to claim 1, wherein the selector lever detent element comprises one of a substantially cylindrical shape and a substantially prismatic shape.

4. The operating device according to claim 3, wherein the selector lever detent element is a spring-loaded detent roller (11).

5. The operating device according to claim 1, wherein the detent mechanism (9) for locking the selector lever (2) is formed in at least two shift gates.

6. The operating device according to claim 1, further comprising a crosspiece (1) for guiding the selector lever (2) and a locking clip (19) is disposed at the crosspiece (1), wherein the locking clip (19) can be latched to the housing base (14) by a locking actuator (18).

7. The operating device according to claim 6, wherein the locking clip (19) is engagable with one end of an armature (17) of an electromagnetic actuator (18).

8. The operating device according to claim 6, wherein the locking actuator is an electromagnetic actuator (18) which has an armature (17), and one end of the armature (17) engages and locks the notched contour (13) while an opposite end of the armature (17) engages and locks the locking clip (19).

* * * * *